Aug. 18, 1925.
E. BURNAND
1,550,148
METHOD OF CONSTRUCTING LAMINATED SPRINGS
Filed Nov. 22, 1923   3 Sheets-Sheet 1
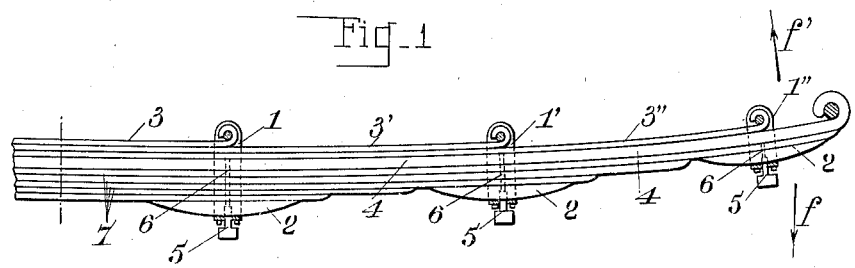
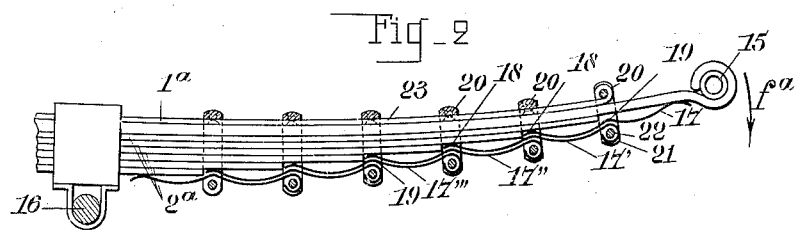
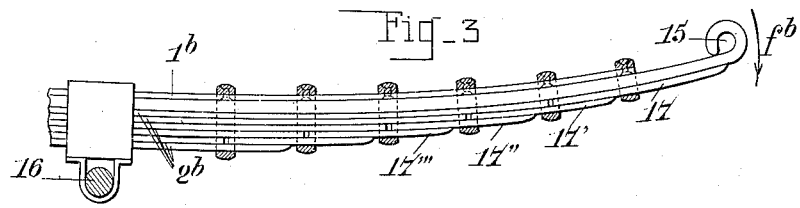
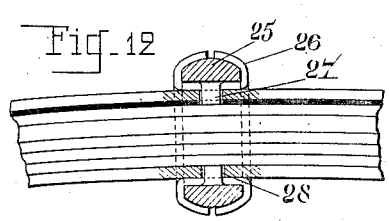 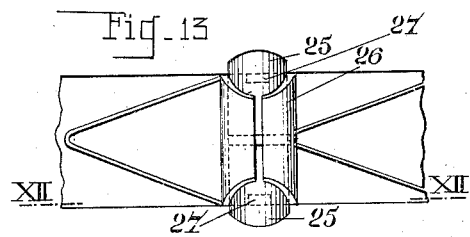
Inventor:
E. Burnand
By
Langner, Parry, Card & Langner
Attys.

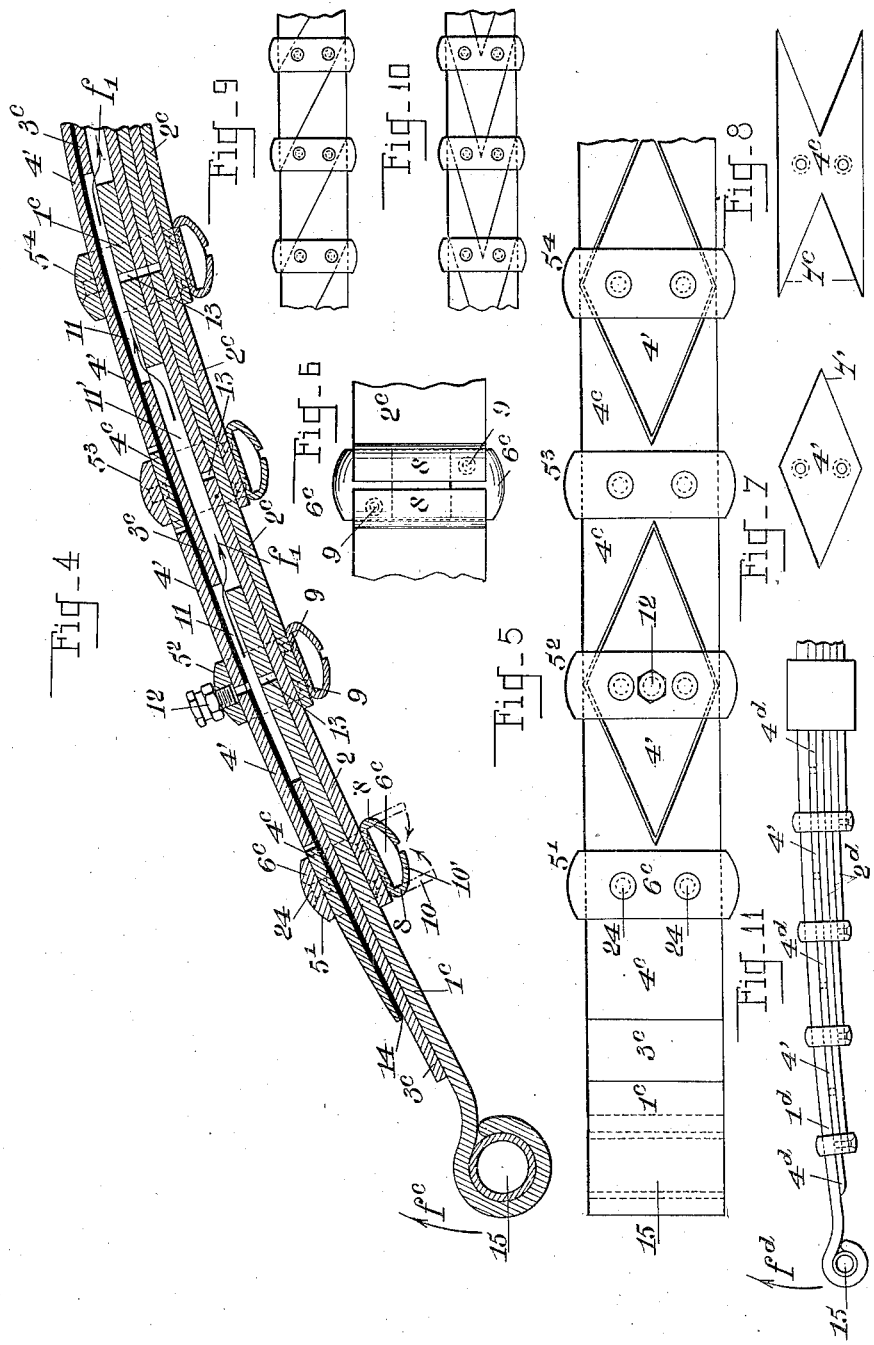

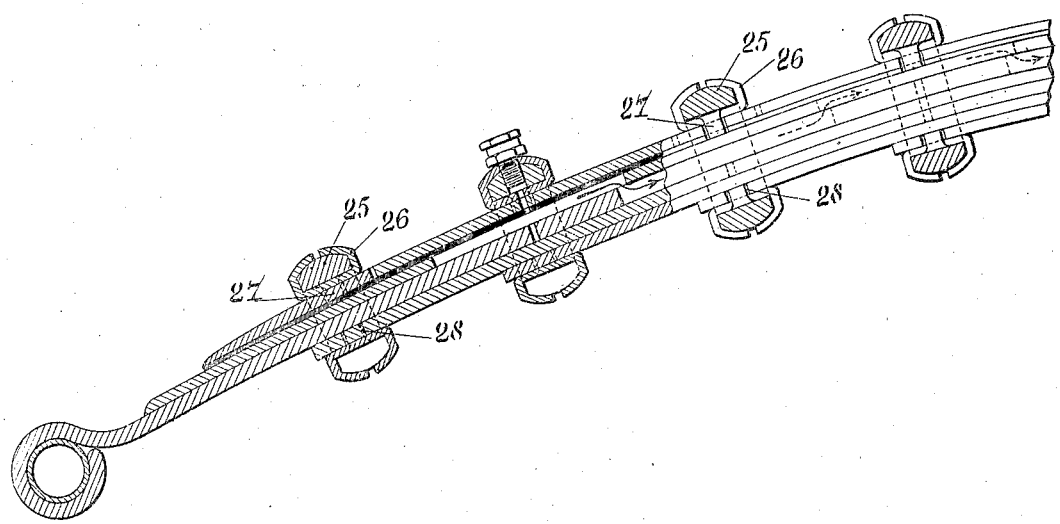
Fig_14

Patented Aug. 18, 1925.

1,550,148

UNITED STATES PATENT OFFICE.

ERNEST BURNAND, OF PARIS, FRANCE.

METHOD OF CONSTRUCTING LAMINATED SPRINGS.

Application filed November 22, 1923. Serial No. 676,393.

*To all whom it may concern:*

Be it known that I, ERNEST BURNAND, a citizen of the Helvetic Republic, residing at Paris, France, 73bis Avenue de Wagram, have invented a new and useful Method of Constructing Laminated Springs, of which the following is a specification.

The present invention has for its object a method of constructing laminated springs permitting an increased sensitivity of the spring to small oscillations and at the same time an increase of the strength of the spring to resist large oscillations. It consists essentially in providing the spring with elastic clips strongly pressed against it, these clips being placed on the surface of the spring towards which bending occurs when an overload is applied to the carriage. In this manner the pressure of the clips against the spring, and in consequence of the lamination between themselves is varied as the spring bends being extremely sensitive to the position of rest, but from the commencement of its bending becoming more and more resistant according to the distance which the axle approaches the chassis under the influence of an overload or shock.

By way of example and in order to facilitate understanding of the present description, in the accompanying drawings—

Figure 1 shows a half spring furnished with three clips spaced apart.

Figure 2 shows an alternative construction in which the series of clips are combined with the main spring.

Figure 3 shows another method of construction in which each clip lamination covers the extremity of one lamination of the spring and of the lamination of the next clip.

Figure 4 shows in longitudinal section another method of construction.

Figure 5 shows a corresponding plan view.

Figure 6 shows a detail plan view of the method of effecting the attachment of the clip.

Figures 7 and 8 show in detail the spring laminations of the clips of which the assembled view is shown in Figures 4 and 5.

Figures 9 and 10 show variations of form of the spring laminations of the clips.

Figure 11 shows a modification of the form of construction shown in Figures 4 to 7 in which the clip laminations are placed between the main lamination and the subsidiary laminations.

Figure 12 shows a sectional elevation taken on the line XII, XII of Figure 13 and Figure 13 shows a plan view of a modification in the method of attaching the spring clips shown in Figures 4 to 10.

Figure 14 shows an embodiment combining the structure of Figs. 12 and 13 with that of Fig. 14.

According to the present invention the spring consists of a number of laminations similar to those generally used; these laminations being adapted to be lubricated by any suitable means and may be separated from one another by layers of fibre or other similar material. With these principal laminations are combined "clips" consisting of plates of short length also of elastic metal which are pressed against the principal laminations by means of stirrups of convenient form. These auxiliary elastic plates are not placed indifferently on either side of the spring, but on the face towards which bending occurs when the spring flexes, under the influence of an overload or of a shock or, in other words on the side toward which the end of the spring is displaced, the center of the spring being assumed to be fixed. The auxiliary plates are thus placed on the upper face of the spring, when its extremity, under the influence of an overload, is displaced upwardly relative to its center, which is assumed to be fixed; and are placed on the lower face when the spring is positioned so that its extremity is displaced downwardly. In other words if the spring is fixed to the chassis by its extremities and to the axle by the thickest portion of the group of laminations, the concave side being therefore turned upwards the auxiliary laminations, will be placed below on the convex face. If, on the contrary, the spring is of the kind known as a "cantilever" in which the spring is fixed to the chassis by the thickest part of the group laminations and to the axle by one of its extremities, the concave side being therefore turned downwards, the auxiliary plates will be placed on the upper convex face.

In the first example of construction shown in Figure 1, of the accompanying drawings, the clips comprise stirrups 1, 1', 1'', which press small auxiliary plates 2 against the group of laminations in such a manner as to press them one against another. The stirrups 1 are attached to their upper part on the laminations 3, 3′, 3″, placed beneath the principal lamination 4. Lubricators 5 of any suitable form can advantageously assure lubrication of the laminations which are provided with a passage 6 for the lubricant. The spring itself is made up of laminations of any suitable shape and curvature; in the example shown in the drawing it comprises a principal lamination 4 and laminations 7 of smaller thickness pressed against it by elastic clips.

The clip thus constructed act in the following manner:—

During the oscillations due to inequalities in the road the various laminations of the spring slide one upon the other and the amount of the resistance which the spring opposes to being bent depends just on the strength with which they are pressed one against the other. The pressure of the clip has therefore the effect of allowing thinner springs for the suspension of the same vehicle. Further, the curve of the laminations 2 being turned, for example, upwards as in the method of construction shown in Figure 1, bending of the spring in the direction $f$, owing to lowering of the chassis gives to the lamination 7 a curvature inverse to that of the lamination 2, a circumstance which increases considerably the pressure of the laminations of the spring one against another and in consequence the resistance to bending of the complete assembly of the spring. The elastic clip has therefore the effect of limiting the extent of the oscillations owing to its increasing the resistance to bending of the spring when its curvature increases.

This permits very great sensitivity to be obtained with springs capable nevertheless of allowing for large shocks; the spring being in its mean position the pressure of the clip is in fact relatively weak, the laminations having free play without much friction. When the bending increases under the influence of an oscillation the pressure of the laminations increases and in consequence the shock is rapidly absorbed.

It may be advantageous as is shown in the drawings to furnish the clips with lubricators of any suitable form, good lubrication of the laminations ensuring greater sensitivity of the spring without decreasing the action of the clips.

The clips could even be arranged as shown in Figures 2 to 10 in such a manner as to be juxtaposed or to cover one another without there being zones of decreased resistance in the spring, such, for instance, as exist in the form shown in Fig. 1, between each lamination 2 and the extremity of the preceding secondary lamination 7. These methods of construction give the important advantage of a very uniform division of the effect of friction over the whole length of the spring without the existence of a single point of lessened resistance in the assembly thus constructed. Just the same as in the method of construction shown in Figure 1 the plates of the clips are placed in such a manner that when the spring bends the pressure which they exert on the group of laminations is increased and as the whole length of the spring is covered by the clips without any discontinuity this pressure on the lamination by the clips is exerted through the whole length of the laminations, each one being thus pressed against its neighbour over the whole surface. Further, no interval being left between the clips which ride upon or abut upon one another, there is no portion of the spring having less resistance analogous to those portions which exist between two successive clips in the example shown in Figure 1.

The method of construction shown in Figure 2 corresponds to the case of an ordinary spring attached to the chassis by the eyelet 15 and fixed to the axle 16 at its centre. The bending of the spring occurring in the direction of the arrow $f^a$ that is, downwardly, the clips are placed below the group of laminations.

The plates 17, 17′, 17″ of the clips are not applied over their whole surface to the group of laminations of the spring: they are of a curved form and do not bear except at their extremities 18 on the laminations of the spring. At their centre they are formed into an arc 19 into which passes the attaching iron 20 of the clip under consideration which presses them very strongly against the group of springs. Each small clip plate except the first one 17 ends at one of its extremities in an eyelet 21 which receives a pin 22 solid with the attaching iron 20. The other extremity 18 presses on the plates of the spring. Each clip lamination 17, 17′, 17″ is placed in an extension of one of the short length plates 2ª. Finally all the attaching irons 20 are riveted on a supplementary lamination which prevents any accidental displacement.

It will be seen solely by inspection of Figure 2 that with the clips overlapping there is not between them any loss of continuity and therefore no zone of less resistance. In addition each of the short length plates 2ª is pressed against the neighbouring laminations by the action of each attaching iron 20 in such a manner that continuity of pressure of the laminations one against another is practically obtained in a very satisfactory manner.

It should be understood that this method of construction permits springs already in use to be converted according to the present invention; it is sufficient without changes or machining to add the lamination 23 provided with its series of clips. The method of construction shown in Figure 3 is a modification of the arrangement above described wherein the plates 17, 17′, 17″, etc., of the clips are applied through their whole surface against the lamination spring. Each clip plate covers in part the lamination of the preceding clip in such a manner that the resistance of the clip increases regularly from the extremity 15 or the centre.

Instead of making the successive plates overlap as has been described above for the purpose of obtaining the same result, the plates can be enclosed one within another, they therefore interpenetrate instead of overlapping and present therefore the outside appearance of a continuous lamination.

In this case also the clip plates can be applied to the group of plates by their whole surface except that they may be partially provided with a bed of fibre.

In these various cases again the continuity of resistance of the spring is fully realized and the principal lamination $1^b$ and the short length plates $2^b$ are well pressed one against another over their whole length.

In the example of construction as shown in Figures 4 to 8 the spring, fixed by its eyelet 15 to the axle and by its centre to the chassis (a "cantilever spring") comprises a principal lamination $1^c$ beneath which are placed a number of short length plates $2^c$ of lesser thickness. Each one of these is maintained at its extremities against its principal lamination by one of the elastic clips. The spring comprises further, a lamination $3^c$ serving to distribute lubricating oil through the whole spring and therefore to the flexible plates $4^c$, $4'$, the elastic clips $5^1$, $5^2$, $5^3$ etc., beneath which is placed a bed of fibre 14.

Each clip consists of an attachment iron $6^c$ enclosing the group of laminations and holding pressed against the group a small elastic plate $4^c$ or $4^1$. The attachment iron $6^c$ and its plate $4^c$ or $4'$, are riveted together by means of a countersunk rivet 24. In the example shown in the drawing one plate $4'$ in two is of lozenge form, the neighbouring plates $4^c$ (Figure 8) presenting a re-entrant shape corresponding to the form of the plate $4'$ in such a manner that one is exactly enclosed within the other as is shown in Figure 5. The points $7^c$ and $7'$, of these clips can be engaged in the attachment iron of the neighbouring clip as is the case in the example of the points $7^c$. A convenient amount of play is left between two neighbouring plates $4^c$ and $4'$ in such a manner as to allow for relative displacement due to bending of the spring.

The attachment iron $6^c$ of the clip is kept closed round the group of laminations by means of a fixing member 8 secured by two counter-sunk rivets 9 to the respective secondary lamination $2^c$ and of which the wings occupying at first the position 10 as shown in chain lines are finally bent over in such a manner as to grip firmly the extremities of the attachment iron as is shown in the full lines at 10′. Figure 4 shows how the attachment iron is placed under the fixing member at the finish of the operation.

The stirrup and the auxiliary plates instead of being fixed to the group of laminations by means of countersunk rivets such as 9 and 24 could be attached by any other suitable means having any special advantage in respect, for example, of simplicity of manufacture. It is in this way that the modification shown in Figures 12 and 13 simplifies very greatly the manufacture of the arrangement.

In this example of construction the stirrup 25 is gripped above and below the group of laminations by a clamp 26 having a U-shaped profile of which two wings are bent over the stirrup. These clamps further carry on each side a tenon 27 formed when they are stamped out and bent over vertically in such a manner as to fit into a hole 28 correspondingly formed in the auxiliary plate with its layer of fibre and in the lower lamination of the spring. These tenons 27 completely suffice to prevent any displacement of the stirrup and auxiliary plate in longitudinal direction and there is no need of any other fixing member. The particular advantage of this arrangement is that the clamp can be made by a single press stroke.

Lubricating passages and member of any suitable form are provided in the laminations of the spring thus constructed. One arrangement particularly simple and convenient, in the present example consists in fitting auxiliary lubricating plates $3^c$ between the spring plates $4^c$, $4'$, of the clips and the principal lamination $1^c$, this lamination presenting a passage 11 to each clip $5^2$, $5^4$ etc. The principal lamination is provided in its turn with passages 11′ under each clip 5′ and $5^3$ etc. in such a manner as to offer to the lubricant a continuous passage from one extremity of the spring to the other; the oil can thus flow through the whole spring though there may be only a single lubricator 12 placed at one extremity, following the path of the arrow $f_1$, and without the oil being able to escape through spaces existing between two neighbouring plates $4^c$ and $4'$, the orifices 13 being further provided from point to point for lubrication of the lower short length plates.

It should be further observed that the particular form according to which the plates $4^c$ and $4'$ are cut out is not in any way limited. These plates can in fact have considerably varying profiles provided that neighbouring plates mesh one with the other in such a manner as to form an assembly having an exterior shape analogous to a single plate and provided the lines of contact between the plates each are shaped in such a manner as not to create points or zones of lessened resistance. It is in this way for example that the plates could have the form shown in Figures 8 and 9.

It should be noted on the other hand, that the elastic plates 4ᶜ, 4', could be of any convenient thickness. Further, to avoid their thickness from being too great in certain cases, two or more layers of plates similar to the plates 4ᶜ, 4', can be superposed, constructed, fixed and lubricated as has been described above.

If the clip plates are not superposed, but interpenetrate one within another and are in the same plane, as in the case of the examples shown in Figures 4 to 10, the clip plates can be arranged inside the group of laminations, their mode of operation remaining exactly as before.

In this way in the arrangement shown in Figure 1 the clip plates 4ᵈ, 4'. analogous for example to those shown in Figures 4 to 8 are placed between the principal lamination 1ᵈ and the secondary lamination 2ᵈ.

Having now particularly described and ascertained the nature of my said invention and in what manner the same is to be performed, I declare that what I claim is:—

1. A laminated spring comprising, in combination, principal laminations, short length auxiliary elastic plates positioned on the principal laminations, stirrups constantly pressing the plates against the laminations, the plates being so placed on the principal laminations as to increase the pressure between the laminations when the spring is deformed under the influence of an increased load.

2. A laminated spring comprising, in combination, principal laminations, short length auxiliary elastic plates so positioned on the laminations as to increase the pressure between the laminations when the spring is deformed under the influence of an increased load, the plates covering the entire length of the spring whereby to avoid any zone of lessened resistance.

3. A laminated spring according to claim 1 in which the auxiliary plates held by the stirrups against the laminations, are juxtaposed and cut into a form in which they interpenetrate one within another while remaining in a common plane, a layer of fibre being interposed between them and the principal laminations.

4. A laminated spring according to claim 1 in which the auxiliary plates are juxtaposed and extend over the whole length of the spring, and in which the stirrups for pressing the said plates against laminations, together with the plates, are retained by upper and lower clamps carrying lateral tenons fitting into corresponding holes formed in the auxiliary laminations and certain of the principal laminations.

In testimony whereof I have signed my name to this specification.

ERNEST BURNAND.